United States Patent
Leung et al.

(10) Patent No.: US 10,607,415 B2
(45) Date of Patent: Mar. 31, 2020

(54) EMBEDDING METADATA INTO IMAGES AND VIDEOS FOR AUGMENTED REALITY EXPERIENCE

(71) Applicant: Google LLC, Mountain View, CA (US)

(72) Inventors: Mira Leung, Seattle, WA (US); Geoffrey Landskov, Mountain View, CA (US); Oleg Veryovka, Seattle, WA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/100,766

(22) Filed: Aug. 10, 2018

(65) Prior Publication Data

US 2020/0051334 A1 Feb. 13, 2020

(51) Int. Cl.
*G06T 19/00* (2011.01)
*G06T 7/73* (2017.01)
*G06F 16/44* (2019.01)

(52) U.S. Cl.
CPC .......... *G06T 19/006* (2013.01); *G06F 16/444* (2019.01); *G06T 7/73* (2017.01); *G06T 2207/10028* (2013.01)

(58) Field of Classification Search
CPC ................................................. G06T 19/006
See application file for complete search history.

(56) References Cited

U.S. PATENT DOCUMENTS

| | | | |
|---|---|---|---|
| 9,317,133 B2 | 4/2016 | Korah et al. | |
| 2010/0191459 A1* | 7/2010 | Carter | G01C 21/32 701/532 |
| 2014/0176604 A1 | 6/2014 | Venkitaraman et al. | |
| 2015/0206348 A1* | 7/2015 | Koreeda | H04N 21/4725 345/633 |
| 2017/0012988 A1* | 1/2017 | Turgeman | H04L 67/28 |
| 2017/0270715 A1* | 9/2017 | Lindsay | G06F 3/011 |
| 2018/0061130 A1* | 3/2018 | Wojdala | G06T 19/006 |
| 2018/0190024 A1* | 7/2018 | Dugan | G06T 19/006 |
| 2018/0204060 A1* | 7/2018 | Merchant | G06K 19/06037 |
| 2019/0197599 A1* | 6/2019 | Zia | G06Q 30/0643 |

OTHER PUBLICATIONS

US 9,245,384 B2, 01/2016, Adhikarik et al. (withdrawn).

* cited by examiner

*Primary Examiner* — Phi Hoang
(74) *Attorney, Agent, or Firm* — Brake Hughes Bellermann LLP

(57) ABSTRACT

A method for embedding metadata into images and/or videos for AR experience is described. In one example implementation, the method may include generating a first image/video including an environment captured by a device and a virtually-rendered augmented reality (AR) object composited with the environment. The first image/video may be embedded with a first metadata. The method may further include generating a second image/video by modifying the first image/video. The second image/video may be embedded with a second metadata. The second metadata is generated based on the first metadata.

20 Claims, 9 Drawing Sheets

700

Generate a first image including an environment captured by a device and a virtually-rendered augmented reality (AR) object composited with the environment, the first image embedded with a first metadata 710

Generate a second image by modifying the first image, the second image embedded with a second metadata, and the second metadata generated based on the first metadata 720

FIG. 7

700 

Generate a first video including an environment captured by a device and a virtually-rendered augmented reality (AR) object composited with the environment, the first video embedded with a first metadata 810

Generate a second video by modifying the first video, the second video embedded with a second metadata, and the second metadata generated based on the first metadata 820

FIG. 8

EMBEDDING METADATA INTO IMAGES AND VIDEOS FOR AUGMENTED REALITY EXPERIENCE

FIELD

This application relates, generally, to augmented reality (AR) applications, and specifically, to embedding augmented reality metadata.

BACKGROUND

Users currently experience augmented reality (AR) by wearing a headset or holding a mobile device with a camera of the device facing a live environment. Users, however, cannot have AR experiences with prerecorded still images or videos without a headset or a mobile device with a camera facing a live environment.

SUMMARY

In one aspect, a method includes embedding metadata into an image or a video so users can interact with the image or video for AR experience. In one example implementation, the example method may include generating an image (e.g., a first image) that includes an environment captured by a device and a virtually-rendered augmented reality (AR) object composited with the environment. The image (e.g., first image) may be embedded with a metadata (e.g., first metadata). The method may further include generating a second image by modifying the first image. The second image may be embedded with a second metadata which is generated based on the first metadata. In another example implementation, the method may be applied for video.

BRIEF DESCRIPTION OF THE DRAWINGS

Example implementations will become more fully understood from the detailed description given herein below and the accompanying drawings, wherein like elements are represented by like reference numerals, which are given by way of illustration only and thus are not limiting of the example implementations and wherein:

FIG. 7 illustrates a flowchart of a method of experiencing AR with an image, according to at least one example implementation.

FIG. 8 illustrates a flowchart of another method of experiencing AR with a video, according to at least one example implementation.

It should be noted that these Figures are intended to illustrate the general characteristics of methods, structure, or materials utilized in certain example implementations and to supplement the written description provided below. These drawings are not, however, to scale and may not precisely reflect the precise structural or performance characteristics of any given implementation, and should not be interpreted as defining or limiting the range of values or properties encompassed by example implementation. The use of similar or identical reference numbers in the various drawings is intended to indicate the presence of a similar or identical element or feature.

DETAILED DESCRIPTION

Augmented Reality (AR) metadata associated with an image/video may be embedded into the image/video to allow users experience AR with the image/video.

In one example implementation, a user may generate an image/video using a device (e.g., a camera of a mobile device). The generated image/video may include an environment (e.g., surrounding environment) captured by the camera of the device and an AR object that is composited with the captured environment. The AR object may be any virtually rendered AR object. The image/video may be embedded with AR metadata generated by an AR software development kit (SDK) on the device. The AR metadata may include contextual environment data which may be a data representation of physical characteristics of the environment. In some implementations, the image/video and the embedded metadata are part of a same file and the AR metadata embedded into the image may be used for reading the image/video and/or modifying the image/video.

In some implementations, the AR metadata may be embedded into the image/video using a serialization procedure and/or may be read using a deserialization procedure. Once the image/video is read, the image/video may be modified, for example, by modifying the AR object and modified AR metadata associated with the image/video may be saved. The reading/modifying of the AR metadata of an image/video allows a user to experience AR with prerecorded image/video. In other words, a user may experience AR offline (e.g., without access to a live environment or a device with a camera). For example, for a user to modify image/video and experience AR, there is no need to have access to a camera on the device as the user may be experiencing AR via an AR application that is reading the AR metadata.

Figure 1:
FIG. 1 illustrates an image (or an environment) captured by a camera of a device, according to at least one example implementation.

FIG. 1 illustrates an image 100 captured by a camera of a device. In one implementation, the image 100 may include an environment 110 captured by the camera. The environment 100 shows a room with furnishings (e.g., chairs, plant, etc.).

In some implementations, the user (e.g., user of a device 950 of FIG. 9) may generate (e.g., record, create, etc.) the image 100 using a camera of the device. The device may be configured with an AR software development kit (SDK) to support AR experiences. The AR SDK may generate metadata (e.g., AR metadata) of the image 110 and embed the generated metadata into the image 100. In one implementation, the image 100 may be embedded with metadata which may include contextual environment data and/or the environment 110 captured by the camera. The contextual environment data may be a data representation of physical characteristics of the environment 110 and may include pose information, lighting estimate information, horizontal and/or vertical surface planes in the world, and/or camera intrinsics.

The pose information may describe a fixed location and orientation of the device in the real world, the estimated lighting information may define the estimated lighting of the image, and/or the planar surface information may describe the knowledge of a real-world planar surface. In some implementations, the AR SDK may generate the metadata using a serialization procedure. The serialization procedure embeds the metadata into the image 100 so that the user may read the metadata to interact/modify with the image 100 for AR experiences, for instance, without a headset or a mobile device (e.g., the user may interact with the image 100 for AR experiences on a desktop computer or any computer without access to a camera).

Figure 2:
FIG. 2 illustrates an image which includes an environment composited with a virtually-rendered AR object, according to at least one example implementation.

FIG. 2 illustrates an image 200 which includes the image 100 (or environment 110) composited with a virtually-rendered AR object 220, according to at least one example implementation.

In some implementations, the user may embed the AR object 220 (e.g., a round table) into the image 100 (or the environment 110) to generate the image 200. For example, the AR object 220 may be embedded into the image 100 by compositing the AR object 220 into the image 100 (or the environment 110). Compositing may be the combining of visual elements from separate sources (e.g., the environment 110 and the AR object 220) into a single image (e.g., image 220), for example, to create an illusion that the visual elements are parts of the same image (e.g., image 200). The AR object 220 may be embedded into the image 100 (or the environment 110) when the user has access to a camera of the device (e.g., camera recording the environment 110). The embedding of the AR object 220 may allow the user to interact with the image 200 for AR experiences. The AR object 220 is just one example of a virtual object and any virtual object (e.g., a virtual lion, virtual scarecrow, etc.) may be composited with the image 100 (or the environment 110) to generate the image 200.

In some implementations, the image 200 may be embedded with metadata (e.g., metadata of the image 200). The metadata of the image 200 embedded into the image 200 includes contextual environment data of the image 200 (for example, generated by modifying the contextual environment data of the image 100 to reflect the compositing of the AR object 220) and the environment 110 and, as described below in reference to FIG. 5. As described above in reference to FIG. 1, the contextual environment data may include physical planar surfaces, pose (position and rotation) of the camera in the environment, lighting estimate information, etc. In some implementations, the contextual environment data may be modified during post-processing.

Figure 3:
FIG. 3 illustrates an image which includes an environment composited with an altered virtually-rendered AR object, according to at least another additional example implementation.

FIG. 3 illustrates an image 300 which includes the environment 110 composited with the virtually-rendered AR object 320, according to at least one example implementation. The AR object 320 may the same as the AR object 220 but located at a different position in the environment 110 (e.g., the AR object 220 being moved to a different location). That is, the image 300 may be generated by moving the AR object 220 of FIG. 2 to a different location as shown in FIG. 3.

In some implementations, the image 300 may be embedded with metadata (e.g., metadata of the image 300). The metadata of the image 300 embedded into the image 300 includes contextual environment data of the image 300 (for example, generated by modifying the contextual environment data of the image 200 to reflect the moving of the AR object 320) and the environment 110 and, as described below in reference to FIG. 6. As described above in reference to FIG. 1, the contextual environment data may include physical planar surfaces, pose (position and rotation) of the camera in the environment, lighting estimate information, etc. In some implementations, the contextual environment data may be modified during post-processing.

In one implementation, users may modify the contextual environment data. For example, a user may modify (e.g., add) planar surfaces, modify lighting estimation, etc. This may result, for example, in additional or different planar surfaces where the virtual object may be placed or a different coloring of the virtual object (e.g. changing the color of light to green), respectively.

Figure 4:
FIG. 4 illustrates an image which includes an environment composited with a replacement virtually-rendered AR object, according to at least one more additional example implementation.

FIG. 4 illustrates an image 400 which includes the environment 110 composited with a virtually-rendered AR object 420, according to at least one example implementation. In some implementations, the image 400 may generated by replacing the AR object 220 of FIG. 2 with the AR object 420 in the environment 110.

In some implementations, the image 400 may be embedded with metadata (e.g., metadata of the image 400). The metadata of the image 400 embedded into the image 400 includes contextual environment data of the image 400 (for example, generated by modifying the contextual environment data of the image 200 to reflect the replacing of the AR object 220 with the AR object 420) and the environment 110, as described below in reference to FIG. 6. As described above in reference to FIG. 1, the contextual environment data may include physical planar surfaces, pose (position and rotation) of the camera in the environment, lighting estimate information, etc. In some implementations, the contextual environment data may be modified during post-processing.

Figure 5:
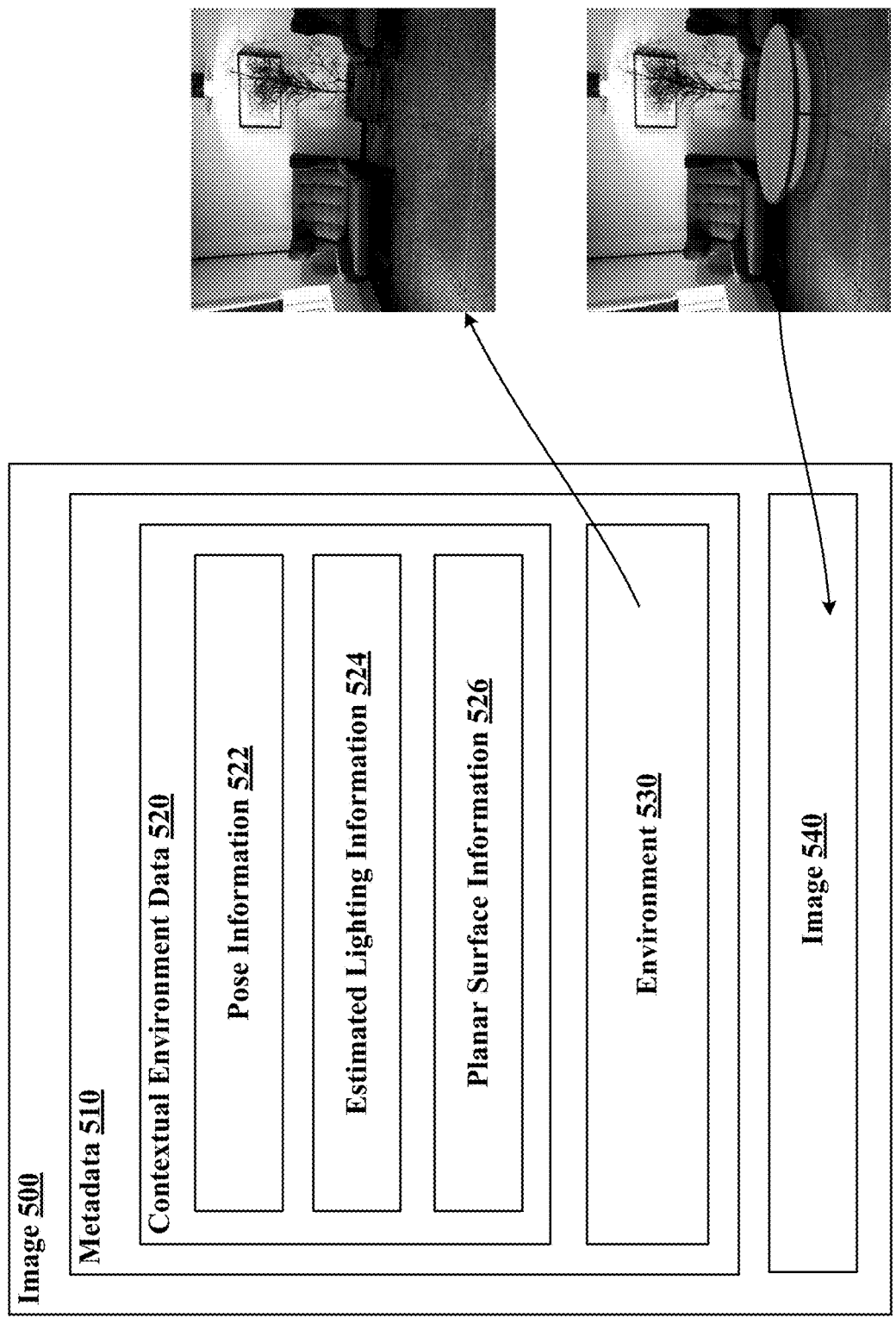
FIG. 5 illustrates a block diagram of an image generated by, for example, by an AR software development kit (SDK) or platform, according to at least one example implementation.

FIG. 5 illustrates a block diagram of an image 500 generated by, for example, an AR SDK on a device, according to at least one example implementation.

As illustrated in FIG. 5, the image 500 may be generated by the device. In some implementations, the image 500 may include metadata 510 and an image 540. The metadata 510 may include contextual environment data 520 which may further include pose information 522, estimated lighting information 524, and planar surface information 520. In addition, the metadata 510 may include the environment 530 as captured by a camera of the device. In some implementations, the image 540 may be created by compositing of the environment 530 with an AR object. For example, the image 540 may be the image 200 (of FIG. 2) and the metadata 510 may be same (or similar) as the metadata of the image 200 of FIG. 2.

The contextual environment data 520 may be a data representation of physical characteristics of the environment 110 (or environment 530), and the images 500 and 540 may be visual representations of the same environment 110. In some implementations, the image 500 may have properties which may allow any image viewer view the image 500 like a normal image, with the image 540 being embedded inside the image 500.

In some implementations, an application may load the image 540 (which may not have the AR object) and separately render the AR object on top. The illustration in FIG. 5 is just one example implementation and applications may use the images in any way.

Figure 6:
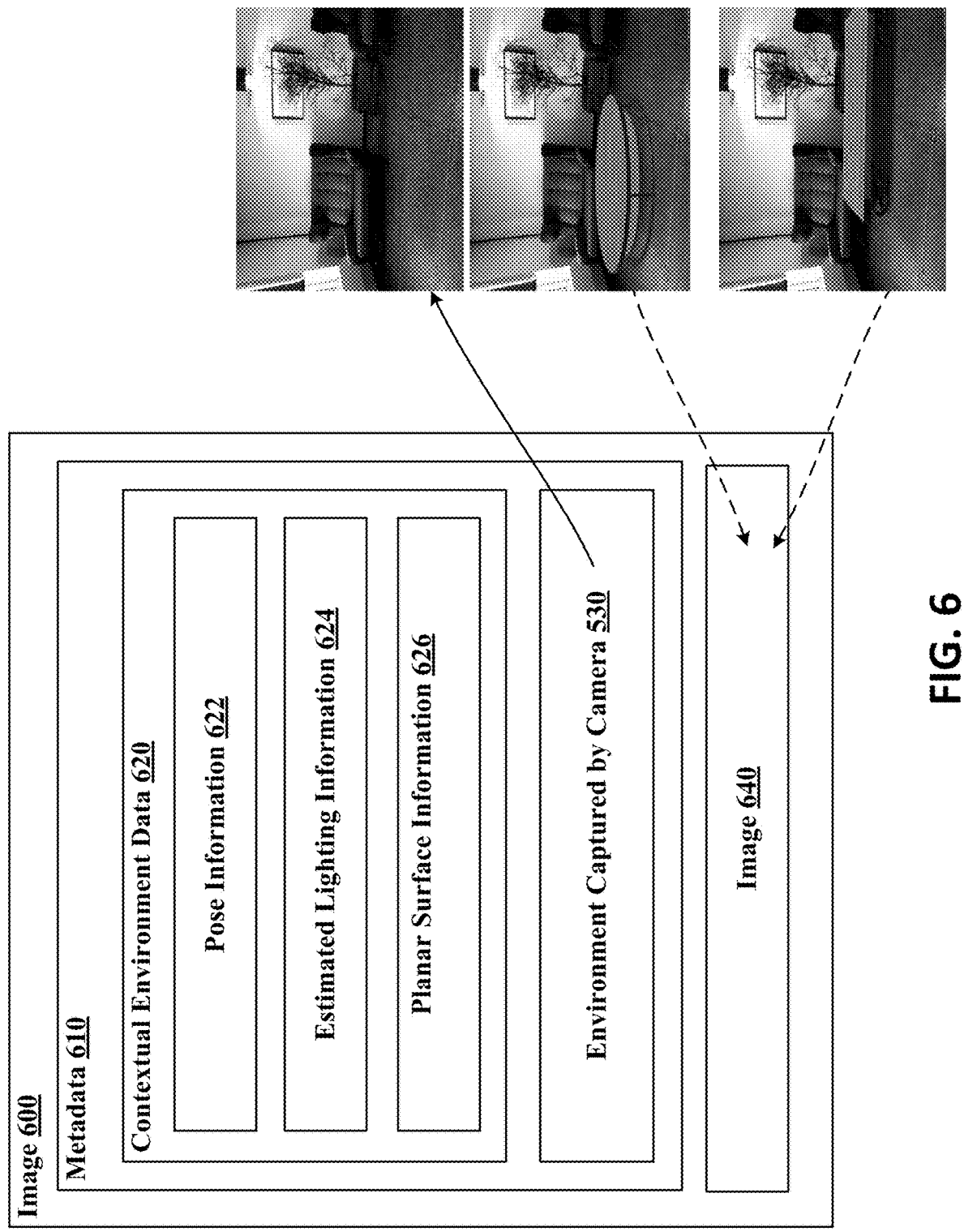
FIG. 6 illustrates a block diagram of an image generated by modifying an image generated by an AR SDK, according to at least one example implementation.

FIG. 6 illustrates a block diagram of an image 600 generated by, for example, by an AR application (e.g., AR photo-editing application), according to at least one example implementation.

As illustrated in FIG. 6, the image 600 may be generated by an AR photo-editing application on the device based on the modifying of the embedded AR object. In some implementations, the modifying may include altering/moving of an AR object (as illustrated in FIG. 3) or replacing of an AR object (as illustrated in FIG. 4).

In some implementations, the image 600 may include metadata 610 and an image 640). The metadata 610 may include contextual environment data 620, which may be the same or similar to the metadata of the image 300 of FIG. 3 or the image 400 of FIG. 4. The contextual environment data 620 may include pose information 622, estimated lighting information 624, and planar surface information 626 to reflect the modifying (e.g. moving/replacing of the AR object) of the AR object. The metadata 610 may further include the environment 630 as captured by a camera of the device.

In some implementations, the first metadata or the second metadata may include the AR object or an identifier associated with the AR object. For example, the AR object may be an entire file that describes the properties and characteristics of the AR object (e.g., 3D AR object) or an identifier may allow an application to download the AR object from the cloud or locate it via an internal database. For instance, the identifier may be a uniform resource locator (URL) to an online repository of 3D models or the AR object may stored in the application and the application may load the AR object upon reading of the AR object.

Although FIGS. 1-6 are described in the context of images (e.g., still images), the proposed implementations apply to videos as well, for example, as described below in detail in reference to FIG. 8.

FIG. 7 illustrates a flowchart 700 of a method of experiencing AR with an image (e.g., still image), according to at least one example implementation. In some implementations, the method may be performed by a device and the device need not have access to a camera on the device, at least during some portions of the method.

At block 710, a device may generate a first image including an environment captured by a device and a virtually-rendered augmented reality (AR) object composited with the environment. For example, in one implementation, a device (e.g., device 950 of FIG. 9) may generate the first image (e.g., image 500) which may include the environment 110 captured by the device and a virtually-rendered AR object 220 composited with the environment 110, to generate, for example, image 540.

The image 500 generated by the device may be embedded with the metadata 510. In some implementations, the metadata 510 may be generated by the AR SDK on the device and the metadata 510 may include contextual environment data 520 and the environment 530 captured by the camera. In some implementations, the contextual environment data 520 may include the pose information 522, the estimated lightning information 526, and/or the planar surface information 526 to provide contextual information associated with the image 500.

At block 720, the device may generate a second image by modifying the first image. For example, in one implementation, the device (e.g., device 950 of FIG. 9) may generate the second image (e.g., image 600) by modifying the first image (e.g., image 500). The modifying of the first image 500 may include altering or replacing the AR object 200 embedded into the first image 500. In some implementations, the altering may include moving or changing the characteristics of the AR object 220 (moving the round table as shown in FIG. 3 relative to FIG. 2) or replacing the AR object 220 with a different AR object, for example, replacing the AR object 220 with the AR object 420 (a round table or anything else, as shown in FIG. 4).

In some implementations, the second image may be embedded with a second metadata that is generated based on the first metadata. For example, when the AR object is altered or replaced, a second metadata (metadata 610/contextual environment data 620) is generated that is based on the first metadata and the second metadata is embedded in the image. Although, the first metadata is generated by the AR SDK on the device, the AR SDK is not required to generate the second metadata as the second metadata is created by modifying existing metadata to reflect the changes. In some implementations, the modifying of the metadata may be performed by an AR photo editing-application which may be able to load the environment (e.g., 530) captured by the camera on the device.

Although the generating of the first image and the second image are described as being generated on the same device, the second image may be generated on a device that is different from the first device. For example, in some implementations, the first image may be generated by a first device, shared with a second device, or the second device being able to access the first image in some other manner. The second device may generate the second image by modifying the first image for AR experience, etc. In some implementations, when the second image is being generated, the user may not need access to a camera on the second device. In other words, the second image may be generated by modifying (e.g., altering, replacing, etc.) the AR object using an AR photo-editing application. In some implementations, for example, the second device may be a desktop computer (e.g., device 900 of FIG. 9).

In some implementations, the device may generate the metadata (e.g., first or second metadata) using a serialization procedure and the device may read the generated metadata using a deserialization procedure. In some implementations, the metadata may be referred to as AR metadata that supports AR experiences with images as the AR metadata is embedded into the images.

FIG. 8 illustrates a flowchart 800 of a method of AR experience with a video, according to at least one example implementation. In some implementations, for example, the method may be performed by a device and the device need not have access to a camera on the device, at least during some portions of the method.

At block 810, a device may generate a first video including an environment captured by the device and a virtually-rendered augmented reality (AR) object composited with the environment. For example, in one implementation, a device (e.g., device 950 of FIG. 9) may generate the first video which may include an environment captured by the device and a virtually-rendered AR object 220 composited with the environment.

The video generated by the device may be embedded with a metadata (e.g., first metadata). In some implementations, the first metadata may be generated by the AR SDK on the device and the first metadata may include frame metadata per each frame of the video and a first global metadata for the first video captured by the camera.

At block 820, the device may generate a second video by modifying the first video. For example, in one implementation, a device (e.g., device 950 of FIG. 9) may generate the second video by modifying the first video.

In some implementations, the second video may be embedded with a second metadata that is generated based on the first metadata. The modifying of the first video may include altering or replacing the AR object 200 embedded into the first video. In some implementations, the altering may include moving or changing the characteristics of the AR object 220 (moving the round table as shown in FIG. 3 relative to FIG. 2) or replacing the AR object 220 with a different AR object, for example, AR object 420 (a round table or anything else, as shown in FIG. 4).

In some implementations, as the AR object is being altered or replaced, the metadata associated embedded in the video changes and the newly modified metadata is saved. Although, the first metadata is generated by the AR SDK on the device, the AR SDK is not required to generate the second metadata as the second metadata is created by modifying existing metadata to reflect the changes. In some implementations, the modifying of the metadata may be performed by an AR photo editing-application on the device.

Although the generating of the first video and the second video are described as being generated on the same device, the second video may be generated on a device that is different from the first device. For example, in some implementations, the first video may be generated by a first device and shared with a second device. The second device may generate the second video by modifying the first image for AR experiences, etc. In some implementations, when the second video is being generated, the user may not require access to a camera on the second device. In other words, the second video may be generated by modifying (e.g., altering, replacing, etc.) the AR object using an AR application. In some implementations, for example, the second device may be a desktop computer (e.g., device 900 of FIG. 9).

In some implementations, the global metadata (first or second global metadata) may include one or more of camera intrinsics, planar surfaces, point clouds, and/or global application metadata. In some other implementations the frame metadata (associated with the first or the second video) may include one or more of camera pose, lighting estimate information, and/or per-frame application metadata. In some implementations, the device may generate the metadata (e.g., first or second metadata) using a serialization procedure and the device may read the metadata generated using a deserialization procedure. In some implementations, the metadata may be referred to as AR metadata that supports AR experiences with video as the AR metadata is embedded into the video.

In some implementations, once the capturing of an image or a recording of a video is complete, the AR SDK application may be still running on the device. During such time, the AR SDK may receive revised (e.g., more accurate) contextual environmental data (e.g., pose information, estimated lighting information, planar surface information, etc.). The method described above may embed the revised contextual environmental data into the image/video to improve AR experiences.

In some implementations, the device (using AR SDK) may capture an image and record a video. The AR SDK may save the image (e.g., to a disk) and upload the video (e.g., to a cloud network). Machine learning may be used to estimate human poses and may be added to the metadata of the image (which may already exists in the image).

In some implementations, the AR SDK may capture an image or record a video with AR metadata embedded into the image/video. If a different (e.g., improved) AR SRK is available and more accurate metadata is generated, the image/video may be updated with the more accurate metadata.

Thus, the above described procedures allow a user have AR experiences with pre-recorded image or video. In some implementations, the user may have AR experiences without access to a camera.

Figure 9:
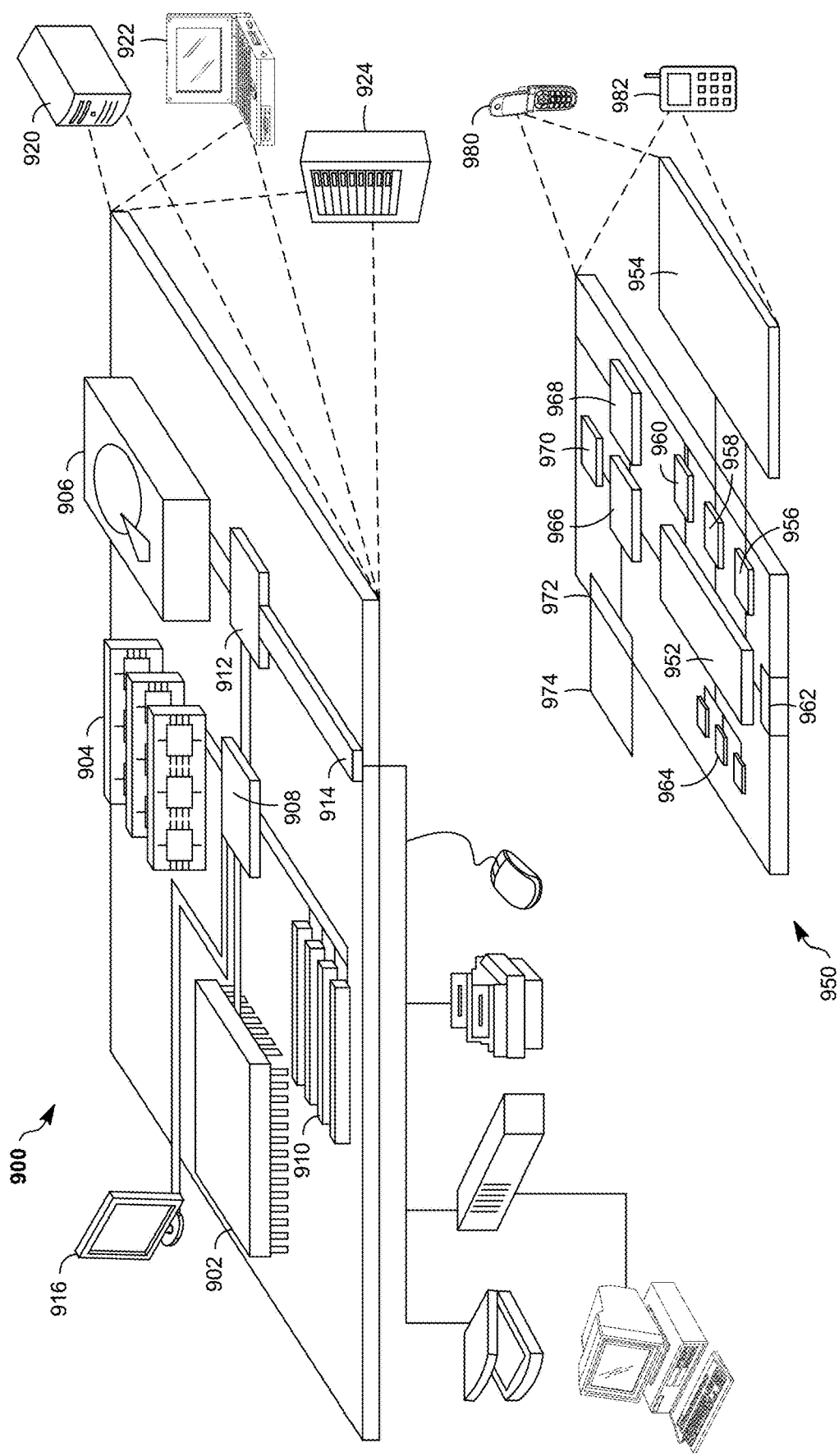
FIG. 9 shows an example of a computer device and a mobile computer device, which may be used with the techniques described herein.

FIG. 9 shows an example of a computer device 900 and a mobile computer device 950, which may be used with the techniques described here. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input or output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. The computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input or output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input or output device such as a display 954, a communication interface 966, and a transceiver 968, among other components. The device 950 may also be provided with a storage device, such as a microdrive or other device, to provide additional storage. Each of the components 952, 954, 964, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, Wi-Fi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. Various implementations of the systems and techniques described here can be realized as and/or generally be referred to herein as a circuit, a module, a block, or a system that can combine software and hardware aspects. For example, a module may include the functions, acts, or computer program instructions executing on a processor (e.g., a processor formed on a silicon substrate, a GaAs substrate, and the like) or some other programmable data processing apparatus.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular embodiments only and is not intended to be limiting of example embodiments. As used herein, the singular forms a, an, and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions or acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example implementations and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative implementations, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example implementations are typically encoded on some form of non-transitory program storage medium or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The example implementations not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or implementations herein disclosed irrespective of whether or

What is claimed is:

1. A method, comprising:
generating a first image including a composite of an environment captured by a device and a virtually-rendered augmented reality (AR) object, the first image embedded with a first metadata including: a first contextual environment data, and the environment captured by the device without the virtually-rendered AR object; and
generating a second image by modifying the first image, the second image embedded with a second metadata that is different from the first data and generated based on the first metadata, and the second metadata including: a second contextual environment data, and the environment captured by the device without the virtually-rendered AR object.

2. The method of claim 1, wherein the modifying includes at least one of altering, moving, or replacing the AR object, and the second image including a composite of the environment captured by the device and the modifying includes altered, moved, or replaced AR object.

3. The method of claim 1, wherein the first image is generated by an AR platform on the device.

4. The method of claim 1, wherein the modifying is performed by an AR photo-editing application on the device.

5. The method of claim 1, wherein the first or second contextual environment data includes corresponding pose information.

6. The method of claim 1, wherein the first or second contextual environment data includes corresponding estimated lighting information.

7. The method of claim 1, wherein the first or second contextual environment data includes corresponding planar surface information.

8. The method of claim 1, wherein the first metadata or the second metadata includes the AR object or an identifier associated with the AR object.

9. The method of claim 1, wherein the first metadata is embedded in the first image using a serialization procedure.

10. The method of claim 1, wherein the first image is generated on a first device and the second image is generated on a second device.

11. The method of claim 10, wherein the first image is generated by an AR platform on the first device and the modifying is performed by an AR photo-editing application on the second device.

12. A method, comprising:
generating a first video including a composite of an environment captured by a device and a virtually-rendered augmented reality (AR) object, the first video embedded with a first metadata including: a first contextual environment data, and the environment captured by the device without the virtually-rendered AR object; and
generating a second video by modifying the first video, the second video embedded with a second metadata, that is different from the first metadata and generated based on the first metadata, and the second metadata including: a second contextual environment data, and the environment captured by the device without the virtually-rendered AR object.

13. The method of claim 12, wherein the first metadata or the second metadata includes:
frame metadata per each frame of the first video or the second video; and
global metadata for the first video or the second video.

14. The method of claim 13, wherein the global metadata includes one or more of:
camera intrinsics, planar surfaces, point clouds, and global application metadata.

15. The method of claim 13, wherein the frame metadata includes one or more of:
camera pose, lighting estimate information, and per-frame application metadata.

16. The method of claim 12, wherein the first video is generated by an AR platform on the device and the modifying is performed by an AR video-editing application on the device.

17. An apparatus, comprising:
a processor; and
a memory, the memory including instructions configured to cause the processor to:
generate a first image that includes a composite of an environment captured by a device and a virtually-rendered augmented reality (AR) object composited with the environment, the first image embedded with a first metadata including: a first contextual environment data, and the environment captured by the device without the virtually-rendered AR object; and
generate a second image by modifying the first image, the second image embedded with a second metadata that is different from the first metadata and generated based on the first metadata, and the second metadata including: a second contextual environment data, and the environment captured by the device without the virtually-rendered AR object.

18. The apparatus of claim 17, wherein the modifying includes at least one of altering, moving, or replacing the AR object of the first image for generating the second image.

19. The apparatus of claim 17, wherein the first or second metadata includes the first or second contextual environment data, respectively, and wherein the first or second contextual environment data includes one or more of pose information, estimated lighting information, and planar surface information.

20. A non-transitory computer-readable storage medium having stored thereon computer executable program code which, when executed on a computer system, causes the computer system to perform a method, comprising:
generating a first image including a composite of an environment captured by a device and a virtually-rendered augmented reality (AR) object composited with the environment, the first image embedded with a first metadata including: a first contextual environment data, and the environment captured by the device without the virtually-rendered AR object; and
generating a second image by modifying the first image, the second image embedded with a second metadata that is different from the first metadata and generated based on the first metadata, and the second metadata including: a second contextual environment data, and the environment captured by the device without the virtually-rendered AR object.

\* \* \* \* \*